(12) United States Patent
Le Craz

(10) Patent No.: US 7,959,982 B2
(45) Date of Patent: Jun. 14, 2011

(54) METHOD FOR COATING A METAL SURFACE WITH AN ULTRAFINE LAYER

(75) Inventor: Sébastien Le Craz, Liege (BE)

(73) Assignee: Centre de Recherches Metallurgiques ASBL—Centrum Voor Research in de Metallurgie VZW, Brussels (BE)

( * ) Notice: Subject to any disclaimer, the term of this patent is extended or adjusted under 35 U.S.C. 154(b) by 1352 days.

(21) Appl. No.: 10/580,245

(22) PCT Filed: Nov. 2, 2004

(86) PCT No.: PCT/BE2004/000157
§ 371 (c)(1),
(2), (4) Date: May 22, 2006

(87) PCT Pub. No.: WO2005/059196
PCT Pub. Date: Jun. 30, 2005

(65) Prior Publication Data
US 2007/0141246 A1 Jun. 21, 2007

(30) Foreign Application Priority Data
Dec. 17, 2003 (BE) .................................. 2003/0666

(51) Int. Cl.
*B05D 7/14* (2006.01)
*B05D 1/02* (2006.01)
*B05D 1/18* (2006.01)
*B05D 1/28* (2006.01)

(52) U.S. Cl. .................. 427/419.1; 427/419.2; 427/318; 427/421.1; 427/428.01; 427/430.1

(58) Field of Classification Search .... 427/419.1–419.3, 427/421.1, 430.1, 428.01, 318
See application file for complete search history.

(56) References Cited

U.S. PATENT DOCUMENTS

| 5,068,134 | A | * | 11/1991 | Cole et al. .................. 427/376.2 |
| 5,853,850 | A | * | 12/1998 | Iwai et al. ..................... 428/148 |
| 6,780,930 | B2 | * | 8/2004 | Lewis et al. ................... 524/800 |
| 2002/0142150 | A1 | | 10/2002 | Baumann et al. ............. 428/328 |

FOREIGN PATENT DOCUMENTS

| AU | 2002335945 B2 * | 6/2003 |
| JP | 63-72887 | 4/1988 |
| JP | 63-297576 | 12/1988 |
| WO | WO00/68460 | 11/2000 |
| WO | WO02/086194 | 10/2002 |
| WO | WO03/048403 | 6/2003 |

OTHER PUBLICATIONS

English-language translation of the International Preliminary Report on Patentability for PCT/BE2004/000157, Sep. 11, 2006, 7 pages.*
http://en.wikipedia.org/wiki/Mutatis_mutandis; retrieved Sep. 20, 2010, 2 pages.*
Patent Abstracts of Japan, vol. 13, No. 187, May 2, 1989 & JP 01011983A (Nisshin Steel Co Ltd).
Patent Abstracts of Japan, vol. 1998, No. 3, Feb. 27, 1998 & JP 09296277A (NKK Corp).

* cited by examiner

*Primary Examiner* — William Phillip Fletcher, III
(74) *Attorney, Agent, or Firm* — Jacobson Holman PLLC

(57) ABSTRACT

A method for continuously coating a substrate in motion such as a metal strip made of steel, the coating formed being an ultra-fine film of a thickness between 10 and 100 nm, deposited on the substrate: from a solution containing nanoparticles of oxides, in conditions of controlled pH, said substrate being at a temperature higher than 120° C., the total duration of the deposition being less than 5 seconds and preferably less than 1 second, characterized in that at least one chemical additive, called a "refiner", is incorporated into said solution, said refiner having, mutatis mutandis, the effect of restricting the formation of said coating.

32 Claims, 2 Drawing Sheets

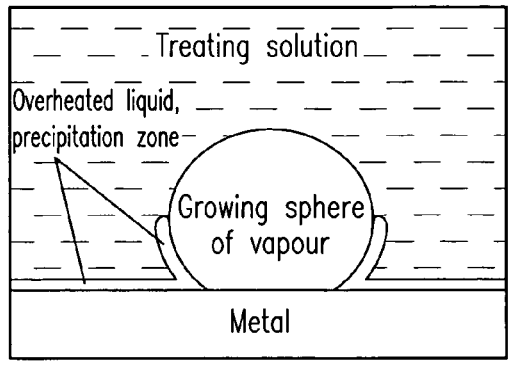
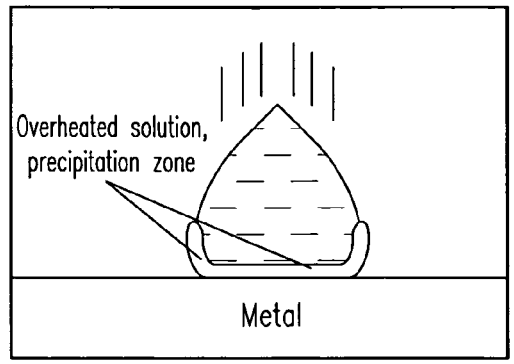
FIG. 2a  FIG. 2b
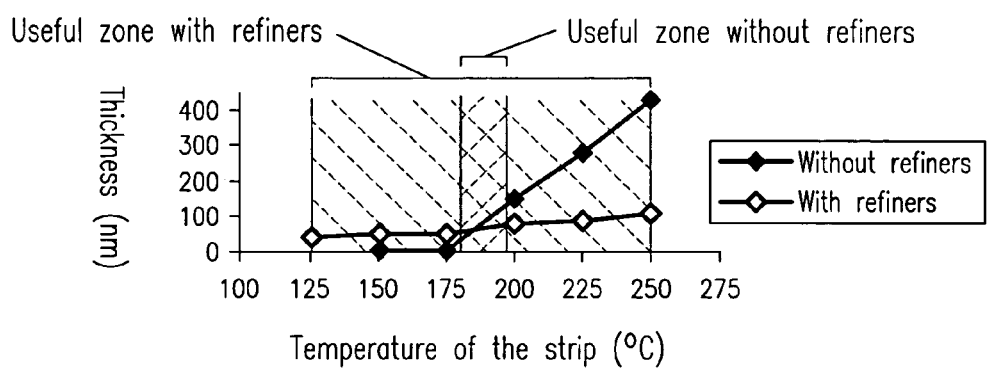
FIG. 3

METHOD FOR COATING A METAL SURFACE WITH AN ULTRAFINE LAYER

This is a nationalization of PCT/BE04/000157 filed Nov. 2, 2004 and published in French.

FIELD OF THE INVENTION

The present invention relates to the improvement of the method described in international patent application WO-A-03/048403 by the use of chemical additives affecting the deposition reaction of an ultra-fine layer of oxide nanoparticles. The addition of such compounds allows to obtain layers of a thickness that is even less than in the above-mentioned patent application, i.e. of a thickness of typically less than 100 nm.

TECHNOLOGICAL BACKGROUND AND THE STATE OF THE ART

The method described in application WO-A-03/048403 A1 is part of a global project intended to reduce the production costs of pre-painted metal strips. In this context, the metallurgists hope to incorporate the lacquering process at the end of the galvanizing line.

The main difficulty to obtain this result has been to find a conversion treatment for the strip that is fast enough to be put between the galvanizing and the painting treatment. The above-mentioned method has also been considered as an alternative to treatments based on chromates.

Being based on the use of the strip's residual heat after galvanizing and spinning, this method does not require any external energy input in order to work.

On the installation side, it is preferably carried out in the descending section that follows the zinc bath. From a practical point of view, it can be installed in place of the tank of dematerialized water that completes the cooling with jets of water steam. The compact deposition system considered here may be a bath or a spray system (wave of water, spraying with jets, etc.). Thus, with the help of some modifications, the investment in the new equipment is limited.

First Approach: Ultra-Fine Layer

Ultra-fine layers, typically less than 100 nm, produced by the proposed method can only be considered for solutions with a low concentration of particles, low strip temperatures or even both. The possibility of also being able to produce deposits of this type for solutions with high concentrations of nanoparticles and/or at high temperature would be very usefully for a simple in-line adaptation of the method.

Moreover, this objective is crucial for obtaining a deposit that perfectly adheres to the metal and for good internal cohesion of the oxide layer. Indeed, for a solution with a low concentration, the nanoparticles in suspension are some distance from each other and thus have little tendency to correctly agglomerate when the solvent evaporates.

However, one problem caused by the use of solutions with medium and high concentration is the formation of localized excessive thicknesses that form a network of very friable "ribs" on the surface of the oxide deposit, as shown in FIG. 1. These result from the preferential precipitation at the interface between the solution and the vapor phase caused during immersion, as diagrammatically described in FIG. 2. This can be seen both on the samples produced in a bath (FIG. 2.a) or by spraying (FIG. 2.b) and it is detrimental to the subsequent adhesion of paint.

Document JP-A-63 072887 teaches a method for producing a steel strip by hot dipping showing excellent resistance to corrosion and good mechanical resistance so that, before the drying of the first layer made of zinc or aluminum, an aqueous solution containing dissolved silica and/or aluminum, lithium silicate, etc. is pulverized on the surface of the strip so as to form an oxide layer comprising $SiO_2$, $Al_2O_3$ or $Li_2SiO$, separately or in a mixture. However, a film of chromate is also formed on the oxide layer so as to increase the resistance to corrosion and the adhesion of the oxide layer, in contrast to the method of the previous application WO-A-03/048403, which was free of hexavalent chrome. This shows that good adhesion of the nanoparticles is far from certain.

Document JP-A-62 166667 discloses a method for forming an oxide layer on the surface of a steel strip coated by hot dipping with a layer of Zn or of a Zn—Al alloy with the aim of preventing deep grey discoloration of the strip. A solution containing one or several of the oxides $ZrO_2$, $Cr_2O_3$, $Al_2O_3$, $Y_2O_3$, $CeO_2$, $ZrBiO_4$ and $Sb_2O_3$ is pulverized on the strip after immersion and thus its temperature is $\geqq 100°$ C. at a concentration in the range of 1-100 $mg/m^2$. The water is evaporated by the intense heat of the steel strip, with the formation of the oxide film. A film of chromate is then formed on the above-mentioned oxide layer. It should be noted that a check of the thickness of the layer is neither considered nor described although this is crucial for good adhesion of the deposit. It seems that the layer of chromate is there to compensate for this omission.

Second Approach: Better Stability of the Solution Depending on the Temperature

When the strip is plunged into the bath, it transfers its heat to the colloidal solution. So as to avoid overheating the latter and thus adversely affecting the bath, it is clearly the intention to remove the excess energy by means of external circulation and a heat exchanger. In fact, despite the presence of this equipment, it has been noted that the bath is adversely affected. It seems that the excess heat retained at the metal-solution interface is responsible for this and causes the precipitation of the solution.

So as to be able to guarantee a satisfactory useful life of the bath, it is absolutely necessary to find a method that allows to use the solution right up until the solvent boils.

Third Approach: a Wider Margin for Maneuver

It is possible to adapt the cooling equipment preceding the tank containing the colloidal solution or the banks of sprays so as to be able to guarantee a constant entry temperature over time. It is necessary to control this parameter so as to guarantee constant thickness of the deposit of nanoparticles on the substrate.

However, in order to be competitive relative to a cold strip treatment placed on the same location, apart from the control of the bath, which is common, it would be preferable to be able to dispose of the need for precision in the temperature or to reduce it. Thus, so that it is less of a restriction to the user, this method should be able to function with a relatively high level of uncertainty regarding the temperature level.

Another disadvantage of an "immersion deposit" treatment such as this in comparison with a cold method is that it is, in addition to being affected by a change in the temperature of the substrate, sensitive to a variation in the thickness of the strip. In fact, at a given temperature, for a given material, the quantity of thermal energy stored is a function of the volume of the body, hence of the thickness in the case of a flat product. In fact, on a galvanizing line, steel strips of different thicknesses can be processed.

Aims of the Invention

The present invention aims to provide a method for coating a metal with an ultra-fine protective film of oxide, preferably of silicon, titanium, zirconium, cerium, yttrium or antimony.

An additional aim of the invention is to allow maximum flexibility of the method relative to the entry temperature of the strip into the bath.

Another aim of the invention is to guarantee reproducibility of the deposit in terms of thickness with a light or heavy weight of the layer.

Another aim of the invention is to guarantee a useful life of the solution that meets the metallurgist's requirements.

Main Characteristic Elements of the Invention

A first aspect of the present invention relates to a method for continuously coating a substrate in motion such as a metal strip made of steel, the coating formed being an ultra-fine film of a thickness of between 10 and 100 nm, deposited on the substrate:
from a solution containing nanoparticles of oxides,
in conditions of controlled pH,
said substrate being at a temperature higher than 120° C.,
the total duration of the deposition being less than 5 seconds, preferably less than 1 second,
characterised in that at least one chemical additive, called a "refiner", is incorporated into said solution, said refiner having, mutatis mutandis, the effect of restricting the formation of said coating.

In the context of the invention, the substrate to be coated is either a bare metal, preferably steel, stainless steel (or "inox"), aluminum, zinc or copper; or a first metal coated with a second metal, preferably a steel strip coated with a layer of zinc, aluminum, tin, or of an alloy of at least two of these metals.

The nanoparticles comprise oxides, preferably $SiO_2$, $TiO_2$, $ZrO_2$, $Al_2O_3$, $CeO_2$, $Sb_2O_5$, $Y_2O_3$, ZnO, $SnO_2$ or mixtures of these oxides, are hydrophilic and/or hydrophobic, have a size of between 1 and 100 nm and are in the solution with a content of between 0.1 and 10%, and preferably between 0.1 and 1%.

The concentration of refiner is between 1 and 20 g per liter (g/L) of solution, preferably between 5 and 10 g/L.

More particularly, the refiner used for the deposit of silica nanoparticles is selected from the group of compounds comprising catechin and its derivatives, hydrofluoric and boric acids, borates, sodium and potassium carbonates and hydrogen carbonates, ammonium hydroxide and amines that are soluble in water. The refiner used for a deposit of nanoparticles of stannous or stannic oxide is selected from the group of compounds comprising borates, potassium carbonates and hydrogen carbonates, ammonium hydroxide and amines that are soluble in water. The refiner used for the deposit of nanoparticles of cerium and zirconium oxide is selected from the group of compounds comprising hydrofluoric, boric and carboxylic acids, and preferably formic, acetic, ascorbic and citric acids.

Still according to the invention, the pH of the solution is adjusted so as to allow the pickling of surface oxides from the metal substrate when it is in contact with the solution, so as to give the particles a maximum electrical charge in order to avoid any agglomeration in the solution and so as to make the particles as reactive as possible without destabilizing the solution.

In particular, the pH of the solutions based on nanoparticles of $SiO_2$, $SnO_2$, $TiO_2$, ZnO or $Sb_2O_5$ is alkaline and is preferably between 9 and 13. The pH of the solutions based on nanoparticles of $ZrO_2$, $CeO_2$, $SiO_2$ or $Sb_2O_5$ is acidic and is preferably between 1 and 5.

As an advantage, the pH of the solutions based on a mixture of nanoparticles is adjusted so that the solution is stable over time. Preferably, in the case of a surface layer of the substrate comprising a component of zinc, aluminum, iron, tin, chrome, nickel or copper, the pH is chosen to be either alkaline or acidic.

According to a first preferred embodiment of the invention, the deposit is achieved by immersing the substrate for a controlled period of time in an immersion tank containing the solution.

According to a second preferred embodiment of the invention, the deposit is achieved by spraying the solution onto the substrate by means of a nozzle, i.e. a device, assisted or not, with gas under pressure, that sprays droplets of the solution.

According to a third preferred embodiment of the invention, the deposit is created by depositing the solution on the substrate by means of a roller.

As an advantage, the solution that comes into contact with the strip is kept at a temperature of less than 100° C., and preferably less than 80° C.

As a further advantage, the temperature of the substrate at the start of the deposition is higher than 125° C. and lower than 250° C.

If the substrate already has a metallic coating before treatment, the temperature of the substrate at the start of the deposition is advantageously higher than 125° C. and lower by 30 to 100° C. than the melting point of the coating metal.

If the substrate has a metallic coating produced by immersion, as in galvanization by immersion, the deposition is preferably achieved just after the deposition of the metallic coating, before the substrate cools down.

Preferably, in the case of a substrate liable to a too-high level of oxidation for this to be eliminated during the deposition, the substrate is protected from excessive contact with air by means of a neutral gas such as nitrogen ($N_2$) or argon.

Preferably again, the deposition is limited in time by varying the depth of immersion in the case of deposition in a solution or the length sprayed in the case of spraying the solution with nozzles.

Still according to the invention, the solution is an aqueous solution or comprises any other solvent capable of effectively dispersing said nanoparticles.

As an advantage, agents for the improvement of resistance to corrosion and/or adhesion to the substrate or the paint and/or to improve the glide during formation are added to the solution.

Provision can be made in the method of the invention for the coated substrate to be rinsed after post-treatment with water or with a solution based on organic silanes or carboxylic acid with an ability to form a strong link with the organic.

Preferably, the method of the invention comprises the means for:
continuously measuring and regulating the pH,
ensuring the replenishment of the solution and the elimination of surplus products of the reaction,
ensuring the homogeneous mixture of the bath so as to avoid turbulence on its surface.

According to an advantageous embodiment, the temperatures of the strip and of the bath, the time the strip remains in the bath, the concentration of nanoparticles in the bath and the pH of the bath are controlled. If necessary, the temperature of the strip, the length of spraying time, the concentration of nanoparticles in the solution sprayed, the spraying flow and the pH are equally controlled.

A second aspect of the present invention relates to an installation for coating a steel strip, comprising a device for obtaining a second coating layer on a first coating layer obtained by hot dipping or by jet spraying, by implementing the above-described method, characterised in that said installation is located after elements ensuring the spinning and solidification operations of the first coating layer, said second coating layer being achieved in this installation at a temperature lower by at least 100° C. than the temperature at which the first coating layer solidifies.

A third aspect of the present invention relates to a flat or long metallurgical product, preferably a strip, wire, profiled section or tube, coated with an ultra-fine protective layer by means of the above-described method, characterised in that said protective layer comprises nanoparticles of oxide or of a mixture of these oxides, preferably $Al_2O_3$, $Y_2O_3$, $SiO_2$, $SnO_2$, $TiO_2$, ZnO, $Sb_2O_5$, $ZrO_2$ or $CeO_2$, and has a thickness of less than 100 nm.

As an advantage, the invention relates to a metallurgical product of the strip coated type as described, the thickness of which, possibly the initial thickness before the profiled section or tube is produced, is between 0.15 and 5 mm.

BRIEF DESCRIPTION OF THE FIGURES

FIGS. 2.a and 2.b already mentioned diagrammatically show the potential precipitation zones when the method of the invention is implemented, in a bath (a) or with a spray (b) respectively.

FIG. 3 diagrammatically shows the development, measured with XPS, of the thickness of the silica coating on galvanized steel, implemented according to the present invention, depending on the temperature. The coating is achieved by immersion in a solution of 2% of $SiO_2$, with and without the effect of a refiner, in this case sodium borate (5 g/L).

Figure 1:
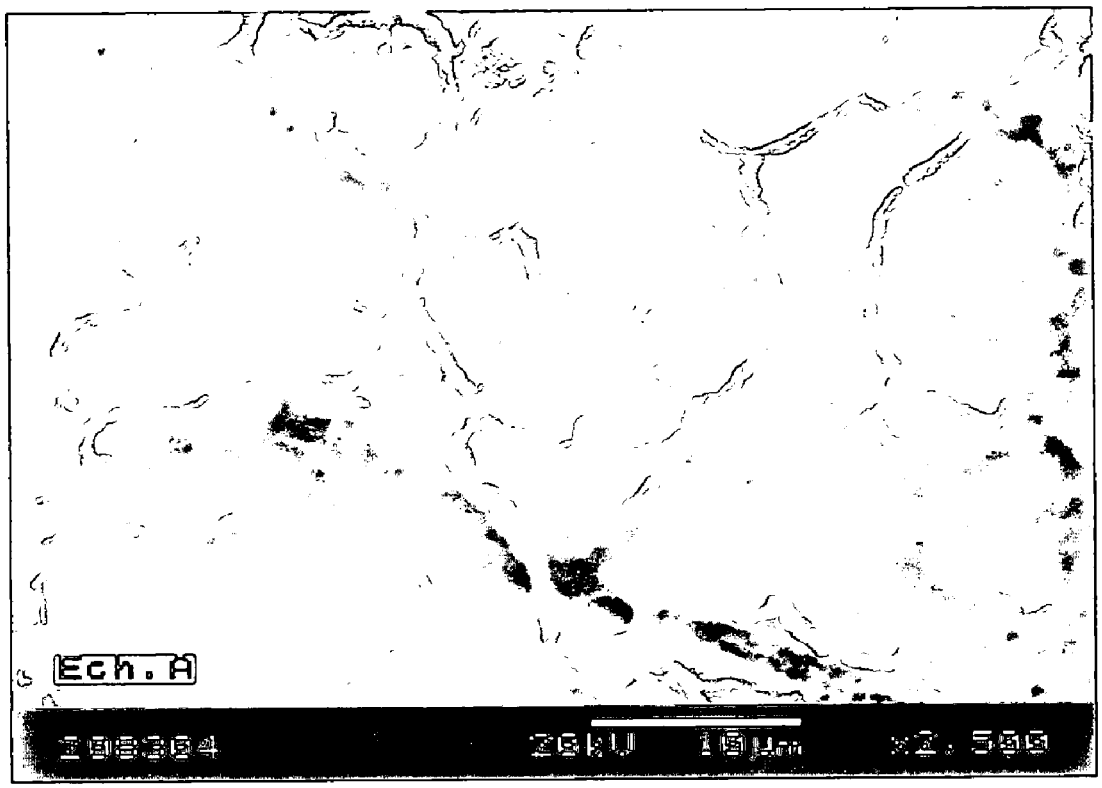
FIG. 1, already mentioned, shows a scanning electron microscope image of a surface treated according to the invention, a layer of $SiO_2$ being deposited at a concentration of 2% by weight.

DESCRIPTION OF A PREFERRED
EMBODIMENT OF THE INVENTION

The innovation introduced in the context of the present invention is based on the principle of obtaining ultra-fine layers of nanoparticles of oxides, where the thickness of said layers is limited by the incorporation in the bath of chemical additives that restrict the deposition reaction, which for this reason are called "refiners" by the Applicant.

The phenomenon of precipitation during the deposition and the stability of the bath are based on the same chemical principles. In fact, the precipitation by immersion is a competition between two opposing mechanisms. There is on the one hand the force that provides the stability of the solution and thus allows the links between the nanoparticles to be broken and on the other hand, the force that allows precipitation.

To control these phenomena as well as possible, compounds comprising some highly specific chemical elements are introduced into the solution.

The role of these compounds is to catalyze the dissolution of the ultra-fine layer and thus to combat massive and chaotic precipitation, i.e. to eliminate the network of ribs on the surface of the oxide, for example. These compounds are called "refiners" by the Applicant because they allow to reduce the weight of the deposit layer. From the chemical point of view, they are to some extent "poisonous" to the deposition reaction.

The discovery of these compounds that restrict the reaction allows to envisage qualities of deposit equivalent to or better than those obtained by conventional cold treatments.

They may allow, in a very wide range of temperature of the strip, to obtain a homogeneous thickness of deposit of nanoparticles (see FIG. 3) and thus an effective control of the weight of the layer of the deposit. It is therefore of interest to note that the addition of these types of chemical allows a deposition at lower temperatures, possibly down to as low as 120° C.

Depending on their concentration, they can also allow to obtain in the bath layers of ultra-fine thickness for any concentration of nanoparticles.

This type of compound must be soluble in the solvent in the ranges of pH of the colloidal solutions envisaged and not cause destabilization of the suspension. In addition, thanks to their ability to break the inter-nanoparticle links, they may enhance the stability areas of colloidal solutions, either in terms of temperature or of pH or both.

In order to be of value, the effectiveness of these compounds must increase with temperature.

According to the present invention, types of mineral or organic chemicals are associated with one or several types of nanoparticles. Thus, a refiner for silica is not necessarily suited for zirconium oxide.

For the deposition of silica nanoparticles, the most effective types are principally catechin, hydrofluoric and boric acids or borates, sodium and potassium carbonates and hydrogen carbonates, ammonium hydroxide and amines that are soluble in water.

For stannous and stannic oxides borates, potassium carbonates and hydrogen carbonates, ammonium hydroxide and amines that are soluble in water will be advantageously used.

Lastly, for cerium and zirconium oxides, hydrofluoric, boric or carboxylic acid or formic, acetic, ascorbic and citric acid will be used to advantage.

Once the deposit is formed, the surplus of the nanoparticles that have not agglomerated under the effect of the refiner and the residual refiners themselves can be rapidly eliminated by a rinse.

It is also of interest to emphasize that in order to conform to the logic of respecting the environment, the compounds used are not carcinogenic.

The invention claimed is:
1. A method for continuously coating a substrate in motion in the form of a metal strip made of steel, the coating formed being a film of a thickness of between 10 and 100 nm, deposited on the substrate:
   from a solution containing nanoparticles of oxides,
   in conditions of controlled pH,
   said substrate being at a temperature higher than 120° C., the total duration of the deposition being less than 5 seconds,
characterised in that at least one chemical additive, called a "refiner", is incorporated into said solution, said refiner having the effect of restricting the formation of said coating.

2. The method according to claim 1, characterized in that the substrate to be coated is either a bare metal or a first metal coated with a second metal.

3. The method according to claim 2, wherein that substrate to be coated is either steel, stainless steel, aluminum, zinc or copper, or a strip of steel coated with a layer of zinc, aluminum, or tin.

4. The method according to claim 1, characterised in that the nanoparticles comprise oxides selected from the group consisting of $SiO_2$, $TiO_2$, $ZrO_2$, $Al_2O_3$, $CeO_2$, $Sb_2O_5$, $Y_2O_3$, ZnO, $SnO_2$ and mixtures of these oxides, the nanoparticles being hydrophilic and/or hydrophobic, having a size of between 1 and 100 nm and being in the solution with a content of between 0.1 and 10%.

5. The method according to claim 4, characterised in that the pH of solutions containing nanoparticles of $SiO_2$, $SnO_2$, $TiO_2$, ZnO or $Sb_2O_5$ is between 9 and 13.

6. The method according to claim 4, characterised in that the pH of solutions containing nanoparticles of $ZrO_2$, $CeO_2$, $SiO_2$ or $Sb_2O_5$ is between 1 and 5.

7. The method according to claim 4, wherein the nanoparticles are in the solution with a content of between 0.1 and 1%.

8. The method according to claim 1, characterised in that the concentration of refiner is between 1 and 20 g per liter (g/L) of solution.

9. The method according to claim 8, characterised in that a refiner used for the deposition of nanoparticles of silica is selected from the group of compounds consisting of catechin and its derivatives, hydrofluoric and boric acids, borates, sodium and potassium carbonates and hydrogen carbonates, ammonium hydroxide and amines that are soluble in water.

10. The method according to claim 8, characterised in that a refiner used for a deposition of nanoparticles of stannous or stannic oxide is selected from the group of compounds consisting of borates, potassium carbonates and hydrogen carbonates, ammonium hydroxide and amines that are soluble in water.

11. The method according to claim 8, characterised in that a refiner used for a deposition of nanoparticles of cerium and zirconium oxides is selected from the group consisting of hydrofluoric, boric and carboxylic acids.

12. The method according to claim 8, characterised in that the refiner used for a deposition of nanoparticles of cerium and zirconium oxides is selected from the group of compounds consisting of formic, ascetic, ascorbic and citric acids.

13. The method according to claim 8, wherein the concentration of refiner is between 5 and 10 g/L of the solution.

14. The method according to claim 1, characterised in that a surface layer of the substrate contains a component of zinc, aluminum, iron, tin, chrome, nickel or copper, and the pH of the solution is alkaline.

15. The method according to claim 1, characterised in that a surface layer of the substrate contains a component of zinc, aluminum, iron, tin, chrome, nickel or copper, and the pH of the solution is acidic.

16. The method according to claim 1, characterised in that the deposit is formed by immersion of the substrate for a controlled period of time in an immersion tank comprising the solution.

17. The method according to claim 16, characterised in that temperatures of the strip and of the bath, the time the strip remains in the bath, the concentration of nanoparticles in the bath and the pH of the bath are controlled.

18. The method according to claim 1, characterised in that the deposit is formed by spraying the solution onto the substrate by means of a nozzle, which is a device, assisted or not, with gas under pressure, that sprays droplets of the solution.

19. The method according to claim 18, characterised in that the temperature of the strip, the length of spraying time, the concentration of nanoparticles in the solution sprayed, the spraying flow and the pH are controlled.

20. The method according to claim 1, characterised in that the deposit is formed by deposition of the solution on the substrate by means of a roller.

21. The method according to claim 1, characterised in that the solution that comes into contact with the strip is kept at a temperature lower than 100° C.

22. The method according to claim 21, wherein the solution that comes into contact with the strip is kept at a temperature lower than 80° C.

23. The method according to claim 1, characterised in that the temperature of the substrate at the start of the deposition is higher than 125° C. and lower than 250° C.

24. The method according to claim 23, characterised in that, if the substrate already has a metallic coating before the treatment, the temperature of the substrate at the start of the deposition is higher than 125° C. and lower by 30 to 100° C. than the melting point of the coating metal.

25. The method according to claim 24, characterised in that, if the substrate has a metallic coating made in galvanization by immersion, the deposit is formed just after the deposition of the metallic coating, before the substrate cools down.

26. The method according to claim 25, characterised in that, the substrate is protected from excessive contact with air by means of a neutral gas such as nitrogen or argon.

27. The method according to claim 24, characterised in that the deposition is limited in time by varying the depth of immersion in the case of deposition in a solution or the length sprayed in the case of spraying the solution with nozzles.

28. The method according to claim 1, characterised in that the solution is an aqueous solution or comprises any other solvent capable of dispersing said nanoparticles.

29. The method according to claim 1, characterised in that agents for the improvement of resistance to corrosion and/or adhesion to the substrate or to a paint and/or to improve the glide during formation are added to the solution.

30. The method according to claim 1, characterised in that the coated substrate may be rinsed after post-treatment by means of water or of a solution based on organic silanes or carboxylic acid capable of forming a link with the organic.

31. The method according to claim 1, characterised in that it comprises the means for: continuously measuring and regulating the pH, ensuring the replenishment of the solution and the elimination of surplus products of the reaction, ensuring the homogeneous mixture of the bath so as to avoid turbulence on its surface.

32. The method according to claim 1, wherein the total duration of the deposition is less than 1 second.

* * * * *